(12) United States Patent
Wilkins et al.

(10) Patent No.: US 8,808,130 B2
(45) Date of Patent: Aug. 19, 2014

(54) GEAR REDUCTION ASSEMBLY AND WINCH INCLUDING GEAR REDUCTION ASSEMBLY

(75) Inventors: Stephen P. Wilkins, Pekin, IN (US); Larry C. Wilkins, Ft. Lauderdale, FL (US)

(73) Assignee: Wilkins IP, LLC, New Albany, IN (US)

( * ) Notice: Subject to any disclaimer, the term of this patent is extended or adjusted under 35 U.S.C. 154(b) by 260 days.

(21) Appl. No.: 13/229,901

(22) Filed: Sep. 12, 2011

(65) Prior Publication Data
US 2012/0065018 A1 Mar. 15, 2012

Related U.S. Application Data

(60) Provisional application No. 61/382,312, filed on Sep. 13, 2010.

(51) Int. Cl.
*F16H 3/70* (2006.01)
*F16H 1/32* (2006.01)

(52) U.S. Cl.
CPC .................................... *F16H 1/32* (2013.01)
USPC ............................ 475/170; 475/169; 475/172

(58) Field of Classification Search
USPC .................................................. 475/163–181
See application file for complete search history.

(56) References Cited

U.S. PATENT DOCUMENTS

| | | |
|---|---|---|
| 253,189 A | 2/1882 | Davies |
| 1,272,182 A | 7/1918 | Appleby |
| 1,453,559 A | 5/1923 | Webb |
| 2,924,430 A | 2/1960 | Smith et al. |
| 3,071,349 A | 1/1963 | Glaze |
| 3,145,974 A | 8/1964 | Short |
| 3,207,005 A | 9/1965 | Geyer |
| 3,265,362 A | 8/1966 | Moody |
| 3,391,583 A | 7/1968 | Sheesley |
| 3,453,907 A * | 7/1969 | Noguchi et al. ............... 475/176 |
| 3,627,087 A * | 12/1971 | Eskridge ....................... 192/223 |
| 3,799,005 A | 3/1974 | Koehler |
| 4,004,780 A | 1/1977 | Kuzarov |
| 4,196,889 A | 4/1980 | Dudek |
| 4,265,142 A | 5/1981 | Watanabe |
| 4,461,460 A | 7/1984 | Telford |
| 4,611,787 A | 9/1986 | May et al. |
| 4,733,579 A * | 3/1988 | Lew ............................... 475/166 |
| 4,736,929 A | 4/1988 | McMorris |
| 4,841,810 A * | 6/1989 | Lew ............................... 475/165 |
| 4,896,567 A * | 1/1990 | Zhou ............................. 475/170 |
| 5,368,279 A | 11/1994 | Ottemann et al. |
| 5,573,091 A | 11/1996 | Hung |

(Continued)

*Primary Examiner* — Tisha Lewis
(74) *Attorney, Agent, or Firm* — Finnegan, Henderson, Farabow, Garrett & Dunner, L.L.P.

(57) ABSTRACT

A gear reduction assembly may include an input shaft, a first spur gear, and a second spur gear. The first and second spur gears may be coupled to one another. At least one of the first spur gear and the second spur gear may be associated with the input shaft such that the input shaft drives at least one of the first and second spur gears. The gear reduction assembly may further include a first internal gear engaged with the first spur gear, a second internal gear engaged with the second spur gear, and a hub associated with the first internal gear. The first and second internal gears have a first number of teeth and a second number of teeth, respectively, and the first number of teeth differs from the second number of teeth by from one to five teeth. The gear reduction assembly may be included in a winch.

55 Claims, 16 Drawing Sheets

(56) References Cited

U.S. PATENT DOCUMENTS

| | | |
|---|---|---|
| 6,481,693 B1 | 11/2002 | Tuominen |
| 6,629,905 B1 | 10/2003 | Sesselmann et al. |
| 7,000,904 B2 | 2/2006 | Huang |
| 7,156,585 B2 | 1/2007 | Wang et al. |
| 7,270,312 B1 | 9/2007 | Phipps |
| 7,276,009 B2 | 10/2007 | Bornchen et al. |
| 7,703,751 B2 | 4/2010 | Elliott et al. |
| 7,731,158 B1 | 6/2010 | Hsieh |
| 7,784,767 B2 | 8/2010 | Gargaro, III et al. |
| 7,789,375 B2 | 9/2010 | Ying |
| 8,434,742 B2 | 5/2013 | Akhavein et al. |
| 2002/0151401 A1 | 10/2002 | Lemanski |
| 2009/0114892 A1 | 5/2009 | Lesko |
| 2010/0048342 A1* | 2/2010 | Chadwick ............ 475/181 |
| 2010/0065799 A1 | 3/2010 | Zhou et al. |
| 2011/0147684 A1 | 6/2011 | Roodenburg et al. |
| 2011/0180770 A1 | 7/2011 | Karambelas et al. |
| 2011/0272653 A1 | 11/2011 | Cilliers |
| 2013/0337965 A1 | 12/2013 | Kuo |

* cited by examiner section A-A section B-B section C-C section D-D

GEAR REDUCTION ASSEMBLY AND WINCH INCLUDING GEAR REDUCTION ASSEMBLY

RELATED APPLICATION

This application claims the benefit of priority under 35 U.S.C. §119(e) of U.S. Provisional Application No. 61/382,312, filed Sep. 13, 2010, the disclosure of which is incorporated herein by reference.

FIELD OF THE DISCLOSURE

The present disclosure relates to gear reduction assemblies, and more particularly, to gear reduction assemblies for winches and winches including gear reduction assemblies.

BACKGROUND

Gear reduction assemblies are often used to facilitate to the use of a less powerful input force or prime mover to perform tasks on high loads. Gear reduction assemblies may also reduce output speed based on the input of a prime mover having an undesirably high output speed.

An example of an application where a gear reduction assembly may be desirable is a winch. For example, winches are often used to deploy or retract a line, such as cable, against a heavy load. Such winches may be hand-operated or motor-driven. Winches may be used when transporting solid and/or liquid cargo via barges along bodies of water, With an increase in a desire to transport cargo more efficiently and with less undesirable emissions, the use of barges to transport cargo has become increasingly attractive. For example, recent studies indicate that transport of cargo by barge is more than 25% more efficient than transport by rail and more than three times as efficient as transport by truck. In addition, transport of cargo by barge results in significantly less undesirable emissions than transport by rail and truck.

In order to increase the efficiency of transport of cargo via barges, a number of barges may be grouped together in a barge "train" or "tow" by cables and pushed or pulled by a single or several boats. For example, as many forty barges may be held together in a group of five rows by eight rows.

In such barge "trains" or "tows," it may be desirable to adjust the tension and/or length of the cables holding the barges together to facilitate control of the barges during the release or addition of barges from the group, or during navigation of a waterway. A common device for facilitating such adjustments is a hand-operated hoist sometimes referred to as a "come-a-long." However, hand-operated hoists, while very portable, suffer from a number of possible drawbacks, such as physically-demanding operation and a tendency to become misplaced.

An alternative to hand-operated hoists is winches, which may be either hand-operated or motor-driven. However, conventional winches may suffer from a number of possible drawbacks. For example, many winches have a drum around which the line or cable is wrapped. However, the diameter of the drum may be relatively small in order to permit use of a relatively small motor or render it easier to reel up the line by hand. This may lead to a number of possible drawbacks related to the line being tightly wrapped around the relatively small drum, such as, for example, creating kinks or deformations in the line, which may have memory due to the large diameter of the line. This may promote problems with the use of such a winch under certain circumstances.

Thus, it may be desirable to provide a gear reduction assembly that provides a relatively dramatic gear reduction in a relatively compact manner. Further, it may be desirable to provide a winch that has a relatively large diameter drum that may be driven with relatively less effort via hand and/or relatively less power via a motor.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to a gear reduction assembly. The gear reduction assembly may include an input shaft, a first spur gear, and a second spur gear. The first spur gear and the second spur gear may be coupled to one another. At least one of the first spur gear and the second spur gear may be associated with the input shaft such that the input shaft drives at least one of the first and second spur gears. The gear reduction assembly may further include a first internal gear engaged with the first spur gear, a second internal gear engaged with the second spur gear, and a hub, such as a drum, associated with the first internal gear. The first internal gear has a first number of teeth and the second internal gear has a second number of teeth, and the first number of teeth may differ from the second number of teeth by from one to five teeth.

According to another aspect, a gear reduction assembly may include an input shaft, a first spur gear, and a second spur gear. The first spur gear and the second spur gear may be coupled to one another. At least one of the first spur gear and the second spur gear may be associated with the input shaft such that the input shaft drives at least one of the first and second spur gears. The gear reduction assembly may further include a first internal gear engaged with the first spur gear, a second internal gear engaged with the second spur gear, and a hub associated with the first internal gear. The first internal gear has a first number of teeth and the second internal gear has a second number of teeth, and the first number of teeth may differ from the second number of teeth by from one to five teeth. The first internal gear has a first diameter and the second internal gear has a second diameter, and the first diameter of the first internal gear may differ from the second diameter of the second internal gear.

According to still a further aspect, a gear reduction assembly may include an input shaft, a first spur gear, and a second spur gear. The first spur gear and the second spur gear may be coupled to one another. At least one of the first spur gear and the second spur gear may be associated with the input shaft such that the input shaft drives at least one of the first and second spur gears. The gear reduction assembly may further include a first internal gear engaged with the first spur gear, a second internal gear engaged with the second spur gear, and a hub associated with the first internal gear. The first spur gear and the second spur gear may have the same number of teeth. The first internal gear has a first number of teeth and the second internal gear has a second number of teeth, and the first number of teeth may differ from the second number of teeth by from one to five teeth.

According to yet another aspect, a gear reduction assembly may include an input shaft, a first spur gear, and a second spur gear. The first spur gear and the second spur gear may be coupled to one another. At least one of the first spur gear and the second spur gear may be associated with the input shaft such that the input shaft drives at least one of the first and second spur gears. The gear reduction assembly may further include a first internal gear engaged with the first spur gear, a second internal gear engaged with the second spur gear, and a hub associated with the first internal gear. The input shaft may define an input axis about which it rotates, wherein the first spur gear and the second spur gear rotate about a common axis, and wherein the common axis is parallel to and spaced from the input axis.

According to still another aspect, a gear reduction assembly may include an input shaft, a first spur gear, and a second spur gear. The first spur gear and the second spur gear may be coupled to one another. At least one of the first spur gear and the second spur gear may be associated with the input shaft such that the input shaft drives at least one of the first and second spur gears. The gear reduction assembly may further include a first internal gear engaged with the first spur gear, a second internal gear engaged with the second spur gear, and a hub associated with the first internal gear. The first internal gear has a first number of teeth and the second internal gear has a second number of teeth, and one of the first and second number of teeth is greater. A ratio of a rotation speed of the input shaft to a rotation speed of the first internal gear may equal the greater of the first number of teeth and the second number of teeth, divided by the difference between the first number of teeth of the first internal gear and the second number of teeth of the second internal gear.

According to a further aspect, a winch for at least one of deploying line and retracting line may include a base member and two side members coupled to the base member. The winch may also include a hub, such as a drum, about which line may be wound and a gear reduction assembly. The gear reduction assembly may include an input shaft extending through an aperture in one of the side members. The input shaft may be rotatably supported by the side member. The gear reduction assembly may further include a first spur gear and a second spur gear, with the first spur gear and the second spur gear being coupled to one another. At least one of the first spur gear and the second spur gear may be associated with the input shaft such that the input shaft drives at least one of the first and second spur gears. The gear reduction assembly may further include a first internal gear engaged with the first spur gear, and a second internal gear engaged with the second spur gear. The first internal gear and the hub may be coupled to one another, with the second internal gear and one of the side members being coupled to one another, wherein rotation of the input shaft results in rotation of the hub.

According to yet another aspect, a winch for at least one of deploying line and retracting line may include a base member and two side members coupled to the base member. The winch may also include a hub, such as a drum, about which line may be wound and a gear reduction assembly including a first internal gear, wherein the hub and the first internal gear are coupled to one another.

Potential objects and advantages of the exemplary embodiments will be set forth in part in the description which follows, or may be learned by practice of the exemplary embodiments.

It is to be understood that both the foregoing general description and the following detailed description are exemplary and explanatory only and are not restrictive of the invention.

The accompanying drawings, which are incorporated in and constitute a part of this specification, illustrate several exemplary embodiments and together with the description, serve to outline principles of the exemplary embodiments.

DESCRIPTION OF EXEMPLARY EMBODIMENTS

Reference will now be made in detail to exemplary embodiments illustrated in the accompanying drawings. Wherever possible, the same reference numbers will be used throughout the drawings to refer to the same or like parts.

Figure 1:
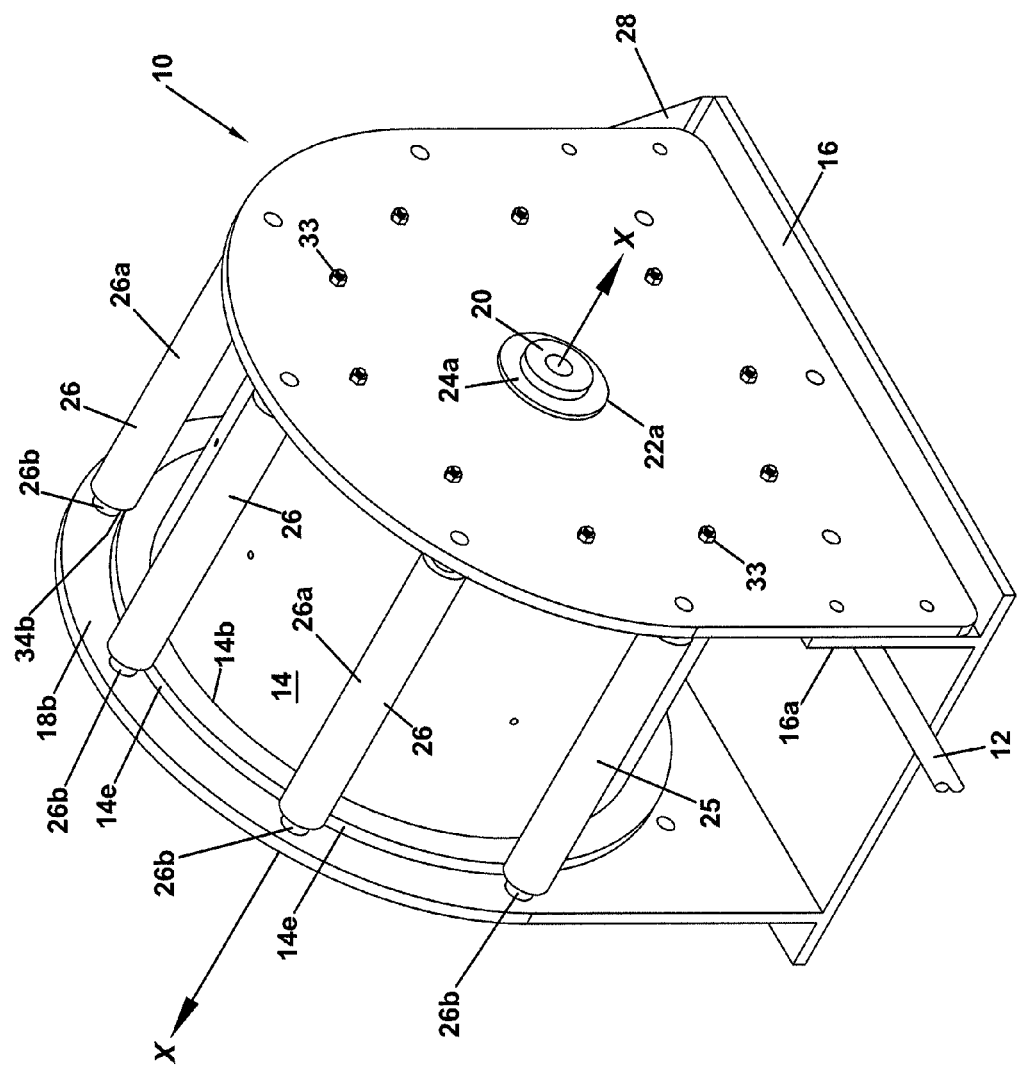
FIG. 1 is a schematic perspective view of an exemplary embodiment of a winch.

FIG. 1 shows an exemplary embodiment of a winch 10. Exemplary winch 10 may be used in a conventional manner to perform a number of tasks related to deploying or paying-out line attached to a load, pulling against a line attached to a load, and/or merely maintaining a tension in the line attached to a load. For example, winch 10 may have a hub 14 about which a cable 12 may be wound, such as exemplary drum shown in FIG. 1. Exemplary winch 10 may be used in association with barges (not shown) for transport of solid and/or liquid goods on waterways. In particular, winch 10 may be used to adjust the tension and/or length of a cable extending between two or more barges grouped together in a barge "train" or "tow." Such adjustment may facilitate control of the barges during the release or addition of barges with respect to the group, or during navigation of a waterway. Other uses for exemplary winch 10 are contemplated.

Although exemplary hub 14 shown in FIGS. 1-11 is a drum for exemplary winch 10, hub 14 may serve as other output devices associated with other machines. For example, hub 14 may serve as a drum for a winch or a spindle adapted to be used on a vehicle, such as, a tow truck, rescue vehicle, or off-road vehicle. In addition, hub 14 may serve as a drum for a winch of a crane.

Figure 2:
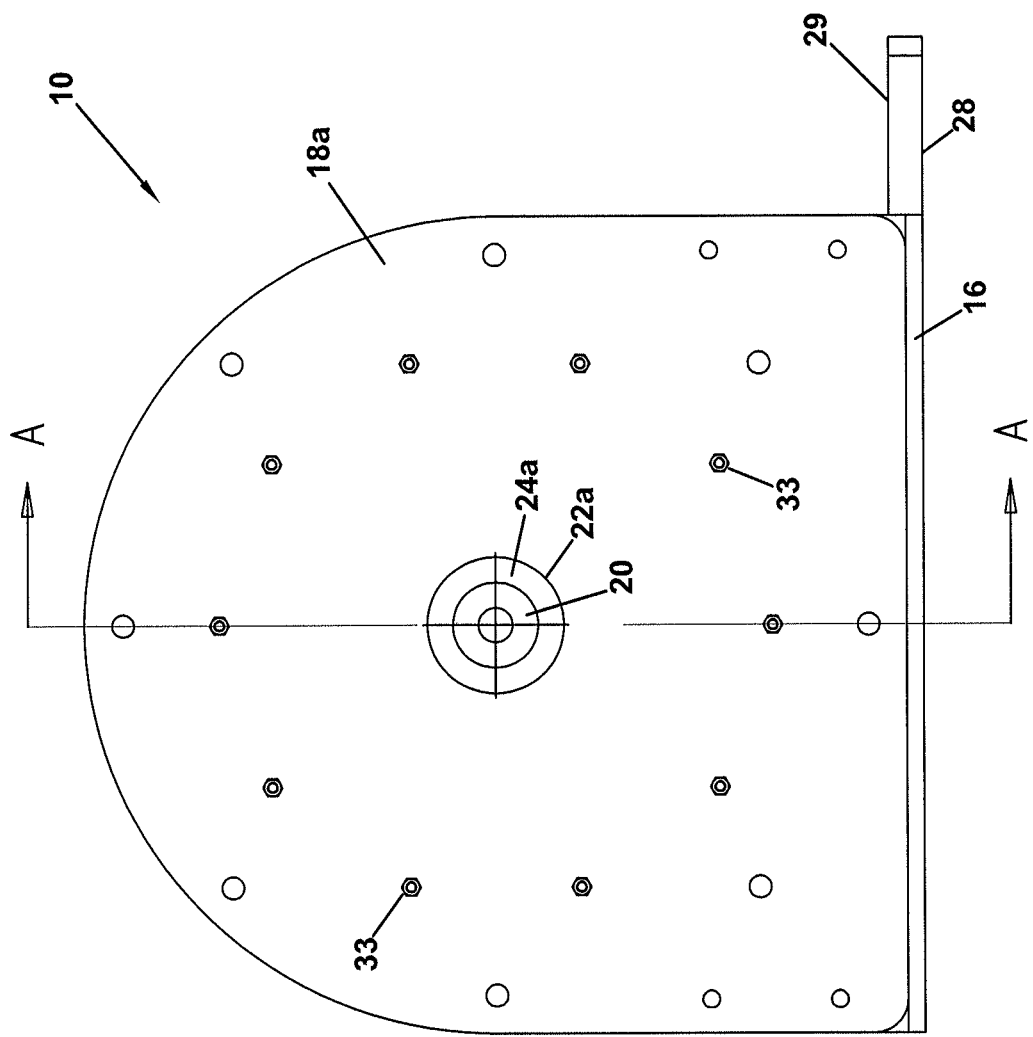
FIG. 2 is a schematic side view of the exemplary embodiment shown in FIG. 1.

Exemplary winch 10 shown in FIGS. 1 and 2 includes a base member 16 and two opposing side members 18a and 18b. Exemplary hub 14 is substantially cylindrical, having a circular cross-sectional shape with a longitudinal axis X extending through the center of the circular cross-section.

Hub 14 is positioned between opposing side members 18a and 18b such that longitudinal axis X is substantially perpendicular to opposing side members 18a and 18b. As explained in more detail herein, exemplary hub 14 is supported in a rotating manner by an input shaft 20, which extends through apertures 22a and 22b of respective opposing sides 18a and 18b (see FIGS. 3 and 4). Input shaft 20, in turn, is supported by bearings 24a and 24b in respective apertures 22a and 22b. Side members 18a and 18b may be held together in a spaced manner by one or more cross-members 26, which in the exemplary embodiment shown, extend between side members 18a and 18b in a substantially perpendicular manner.

Arranged in this exemplary manner, input shaft 20 may be driven by hand operation via, for example, a handle (not shown), and/or by a motor (not shown), such as, for example, an electric motor, or an engine, such as, for example, an internal combustion engine, or a combination thereof. As input shaft 20 is driven rotationally in this manner, hub 14 rotates, thereby deploying or paying-out, and/or retracting a line, such as cable 12, as it is unwound or wound-up around hub 14.

According to some embodiments, exemplary winch 10 may be capable of acting against loads of as much as, for example, 25 tons to 75 tons, for example, 40 tons, or more. Some embodiments may be used in combination with motors and/or engines having, for example, 5 horsepower to 25 horsepower or more. Some embodiments of exemplary winch 10 may be capable of being used with line, such as cable (or wire-rope), having a diameter of between about, for example, 0.25 inch to 1.50 inches, for example, 1.0 inch. Hub 14 may be between about, for example, 6 inches and 90 inches long, for example, 6 inches to 12 inches long, in the direction of the longitudinal axis X. Hub 14 may have a diameter based on the circular cross-sectional shape between about, for example, 6 inches and 90 inches, for example, 18 inches. Other capabilities and/or dimensions are contemplated.

Figure 5:
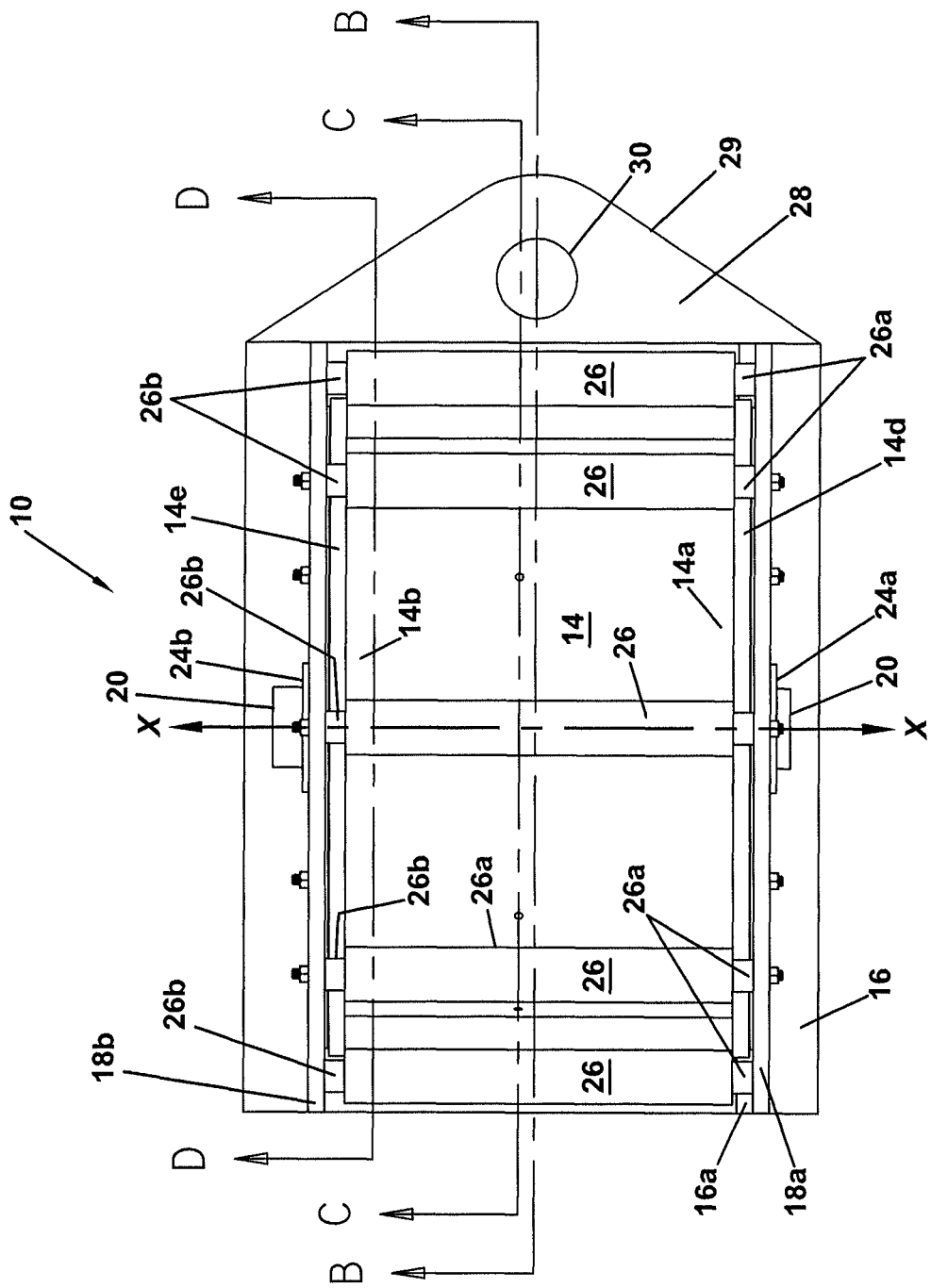
FIG. 5 is a schematic top view of the exemplary embodiment shown in FIG. 1.

As shown in FIGS. 2 and 5, exemplary base member 16 includes an anchor 28 formed by an extension 29 of base member 16. Exemplary anchor 28 includes an aperture 30. Anchor 28 may be used to couple exemplary winch 10 to a support. For example, winch 10 may be placed on a barge (not shown) and, for example, a post, stud, or bolt may extend through aperture 30, thereby holding winch 10 in a fixed position relative to the supporting structure. Other anchor structures are contemplated, such as anchor structures having multiple apertures, structures anchored to the supporting structure by fixed means (e.g., welding), etc.

Figure 3:
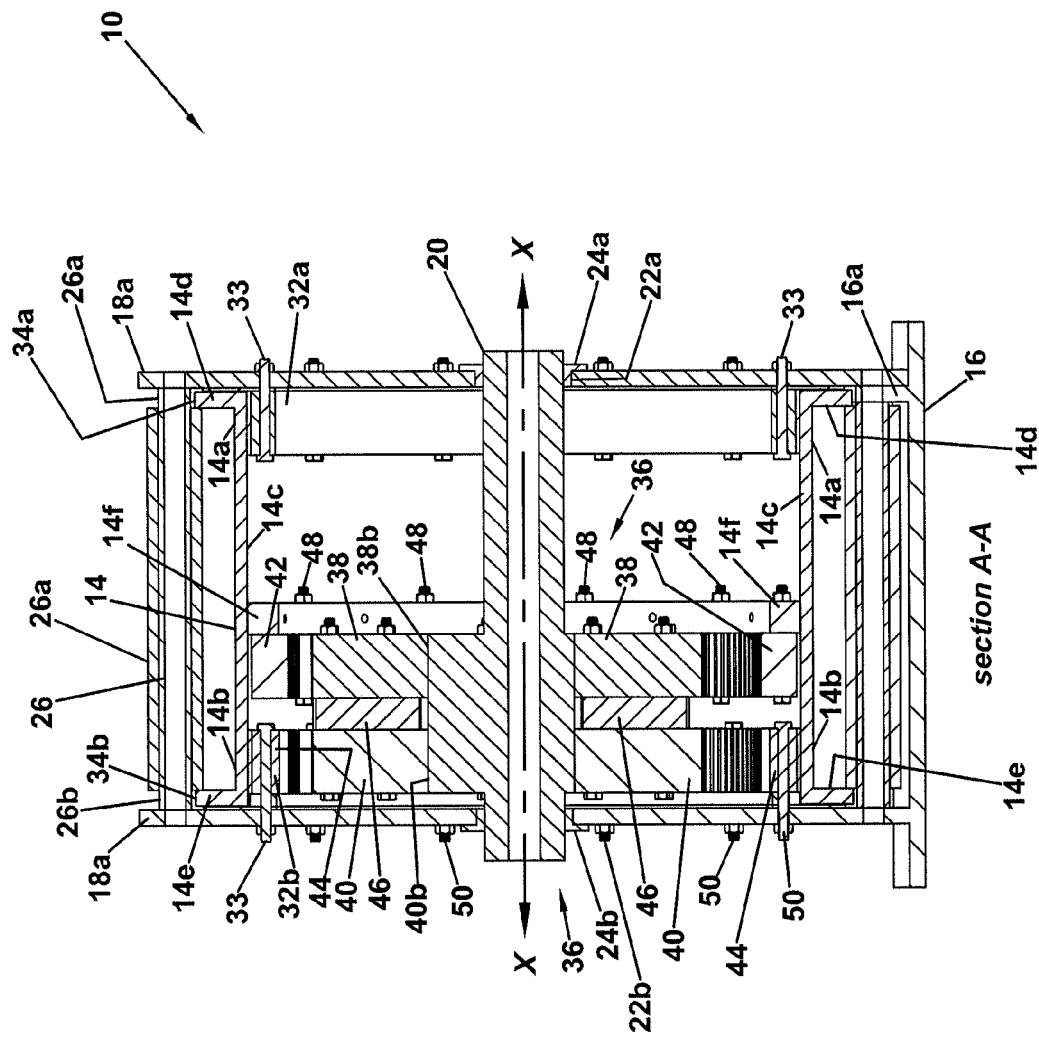
FIG. 3 is a schematic end section view taken along line A-A of FIG. 2.
Figure 4:
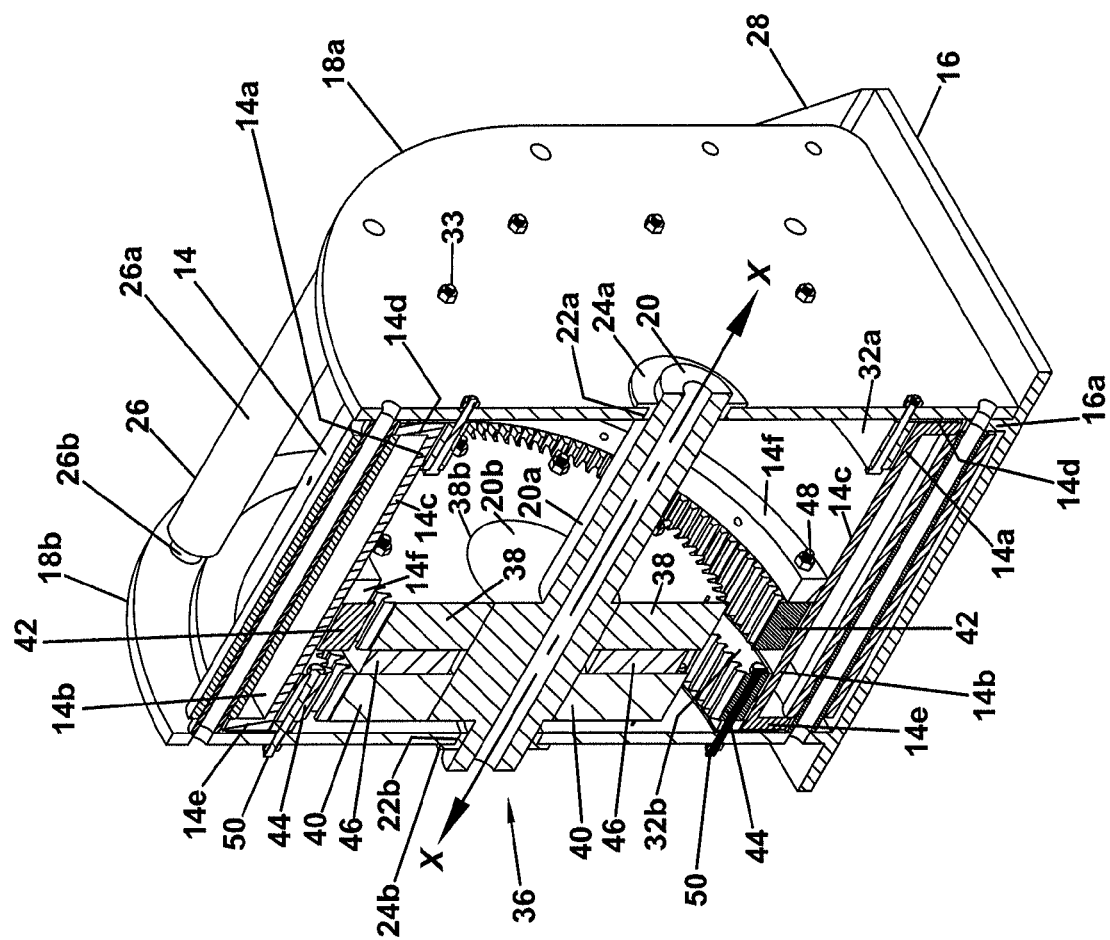
FIG. 4 is a schematic perspective section view taken along line A-A of FIG. 2.

Opposing side members 18a and 18b may be secured to base member 16 such that they extend from base member 16 in a substantially perpendicular manner, as shown in FIGS. 1, 3, and 4. For example, side members 18a and/or 18b may be coupled to base member 16 via welding, adhesives, and/or fasteners, such as, for example, bolts and rivets. Alternatively, base member 16 may be formed integrally with one or more of side members 18a and 18b via for example, extrusion, casting, or forging.

Figure 6:
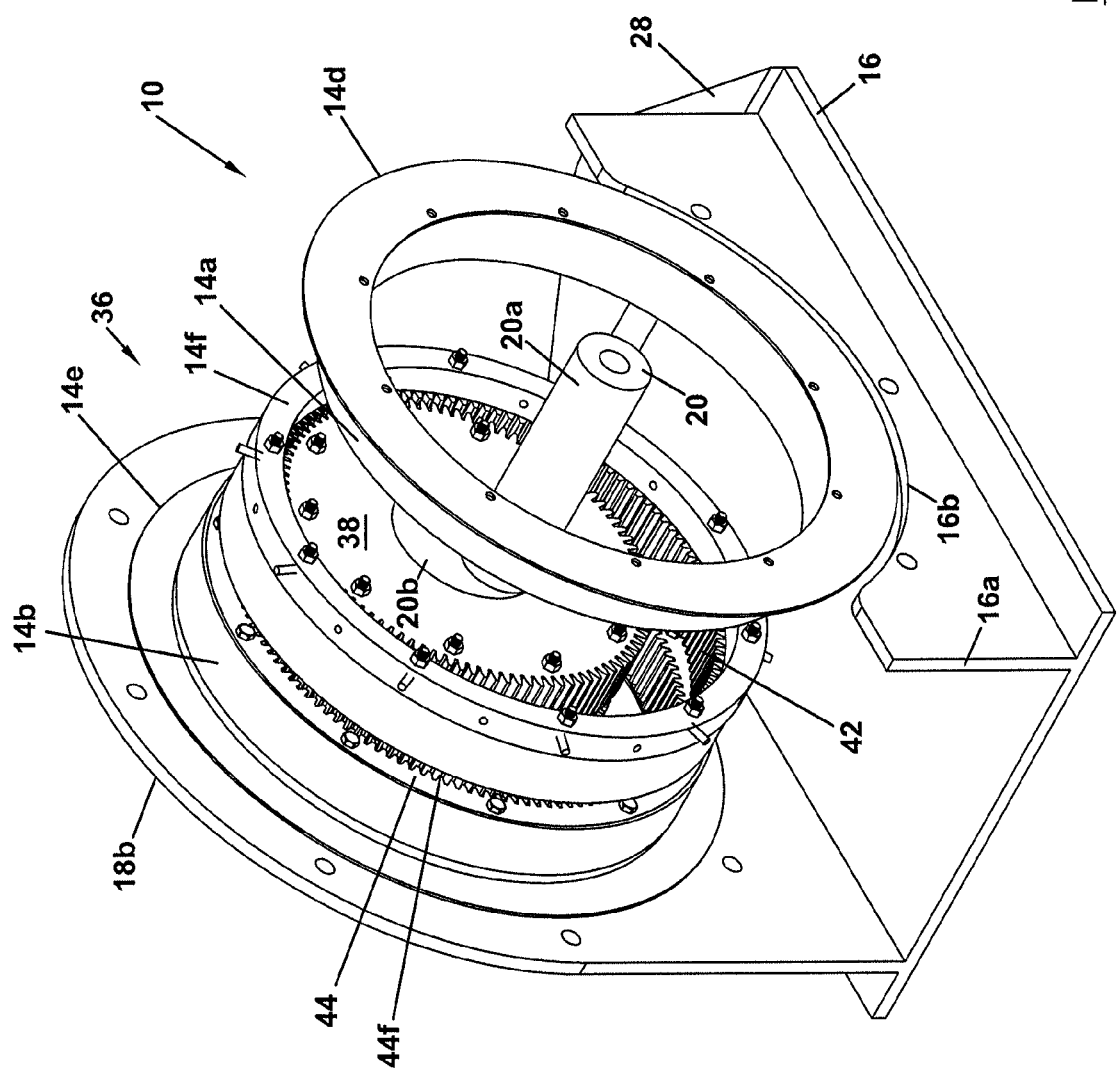
FIG. 6 is a partial perspective exploded view of the exemplary embodiment shown in FIG. 1.

As shown in FIGS. 1 and 4, for example, base member 16 is integral with side member 18b. However, side member 18a is coupled to a flange 16a of base member 16. According to some embodiments, flange 16a may be formed integrally with base member 16, either via extrusion, casting, or forging. As shown in FIG. 6, flange 16a may be configured to provide clearance for hub 14 in the form of, for example, a semi-circular-shaped upper edge 16b. Side member 18a may be coupled to flange 16a via fasteners, such as bolts or rivets.

As shown in FIGS. 3 and 4, exemplary winch 10 includes guide members 32a and 32b configured to guide and/or support edges 14a and 14b of hub 14. For example, guide members 32a and 32b form a circular-shaped support extending from the inside faces of respective side members 18a and 18b. Exemplary guide members 32a and 32b may be coupled to side members 18a and 18b via a plurality of bolts 33, as shown. According to some embodiments, guide members 32a and 32b may be coupled to side members 18a and 18b via welding and/or adhesives, or they may be formed integrally with side members 18a and 18b.

As shown in FIGS. 3 and 4, exemplary hub 14 is substantially hollow, including a tubular member 14c extending between edges 14a and 14b. Although exemplary tubular member 14c has a circular-shaped cross-section, tubular member 14c may have other cross-sectional shapes, such as, for example, multi-sided shapes such as octagonal, hexagonal, pentagonal, and square-shaped. As shown in FIG. 6, exemplary hub 14 includes external flanges 14d and 14e associated with edges 14a and 14b, which extend radially outward from tubular member 14c. External flanges 14d and 14e may serve to prevent cable 12 from binding against side members 18a and 18b and/or from tending to push side members 18a and 18b apart from one another, thereby potentially creating a gap between edges 14a and 14b into which cable 12 may fall. Exemplary external flanges 14d and 14e may be formed integrally with tubular member 14c, for example, by belling tubular member 14c, or external flanges 14d and 14e may be formed separately and thereafter coupled to tubular member 14c via welding, adhesives, and/or fasteners.

According to some embodiments, winch 10 may be configured such that a line, such as cable 12, wound around hub 14 may not exceed a single layer of cable windings. For example, for a known length of cable 12 having a known diameter, hub 14 may have a circumference and longitudinal length between external flanges 14d and 14e sufficient to permit all of a desired length of cable to be stored on hub 14, without any of the cable 12 overlapping itself. This may be desirable to promote reliable deployment and/or retraction of cable 12 by winch 10.

As shown in FIGS. 1 and 3, exemplary cross-members 26 may be configured to provide clearances 34a and 34b for respective external flanges 14d and 14e. For example, exemplary cross-members 26 include rod-like members having a dual-diameter cross-section, with a relatively larger cross-section 26a extending between two relatively smaller cross-sections 26b, with relatively smaller cross-sections 26b providing clearances 34a and 34b. Cross-members 26 may be coupled to side members 18a and 18b via fasteners such as bolts and/or rivets. Alternatively, one end of cross-members 26 may be coupled to a respective side member 18a or 18b via welding and/or adhesives, with the other end being coupled to the other side member via fasteners.

As shown in FIGS. 3, 4, and 6, exemplary embodiment of hub 14 includes an internal flange 14f configured to be coupled to input shaft 20 via a gear assembly, as explained in more detail below with respect to FIGS. 7-13. For example, internal flange 14f extends radially inward from tubular member 14c of hub 14 at a point between edges 14a and 14b (e.g., at a generally central location or longitudinal mid-point of tubular member 14c). Internal flange 14f may be formed integrally with tubular member 14c or coupled to tubular member 14c via welding, adhesives, and/or fasteners.

Figure 7:
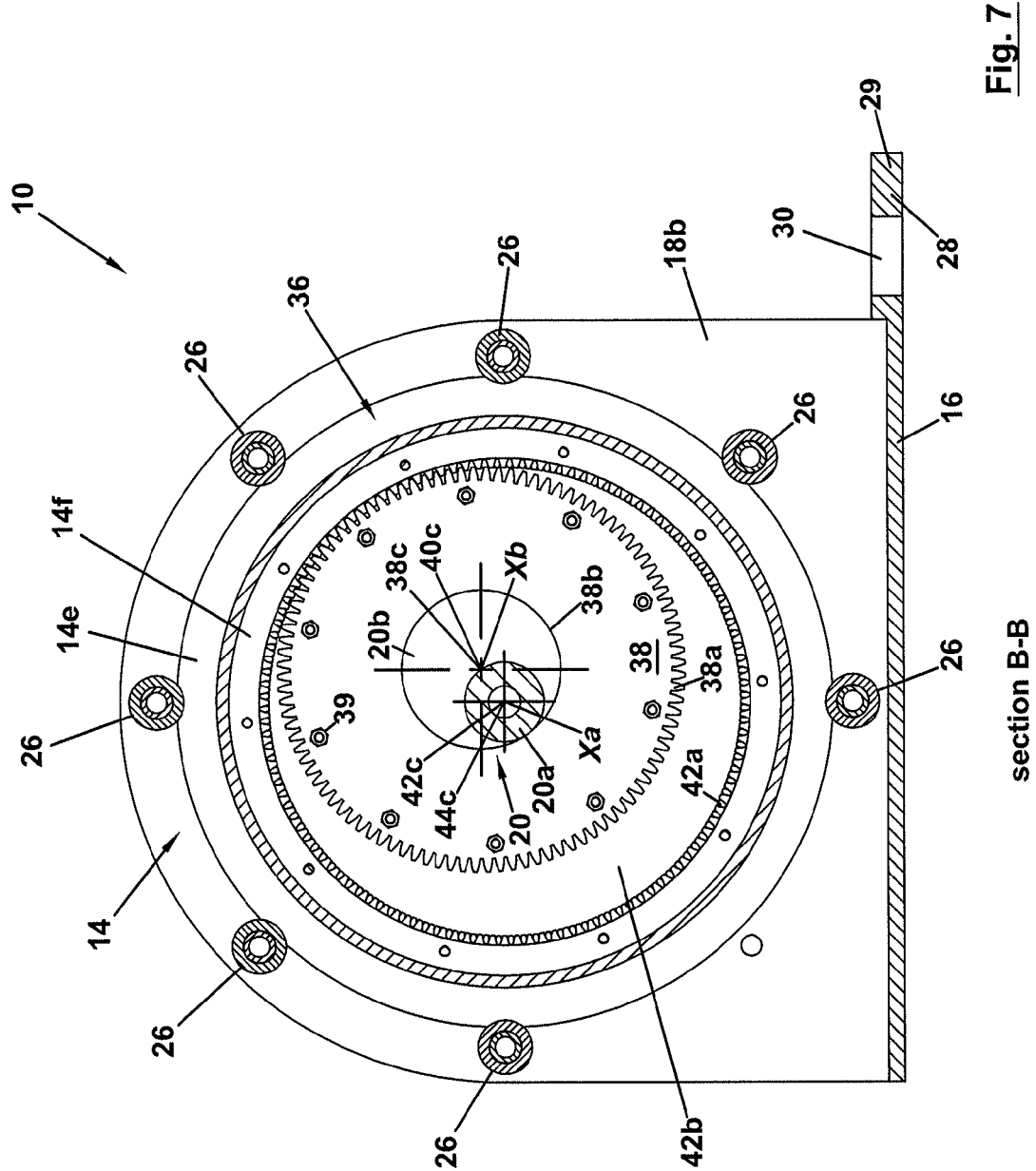
FIG. 7 is a schematic side section view taken along line B-B of FIG. 5.
Figure 8:
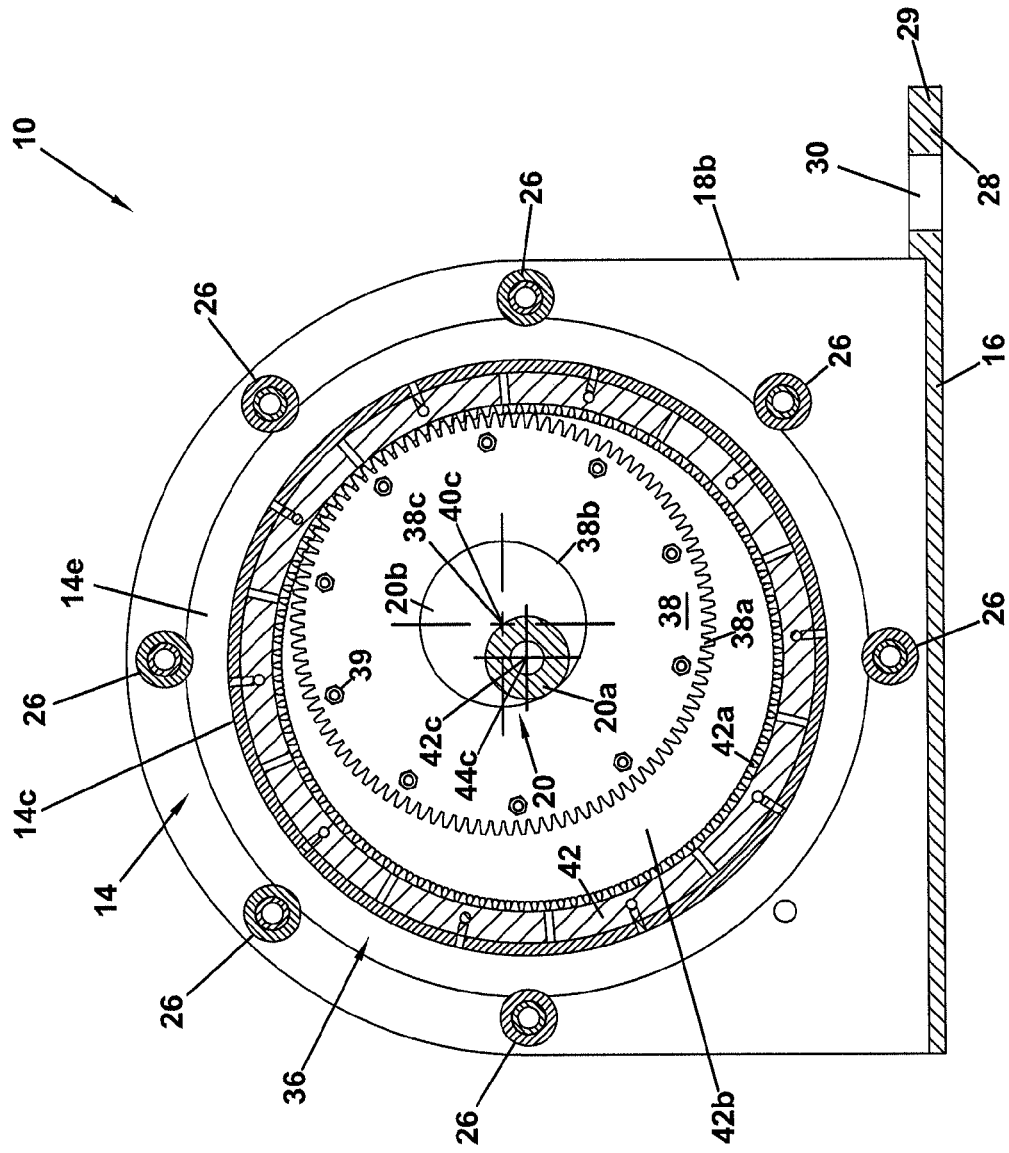
FIG. 8 is a schematic side section view taken along line C-C of FIG. 5.
Figure 9:
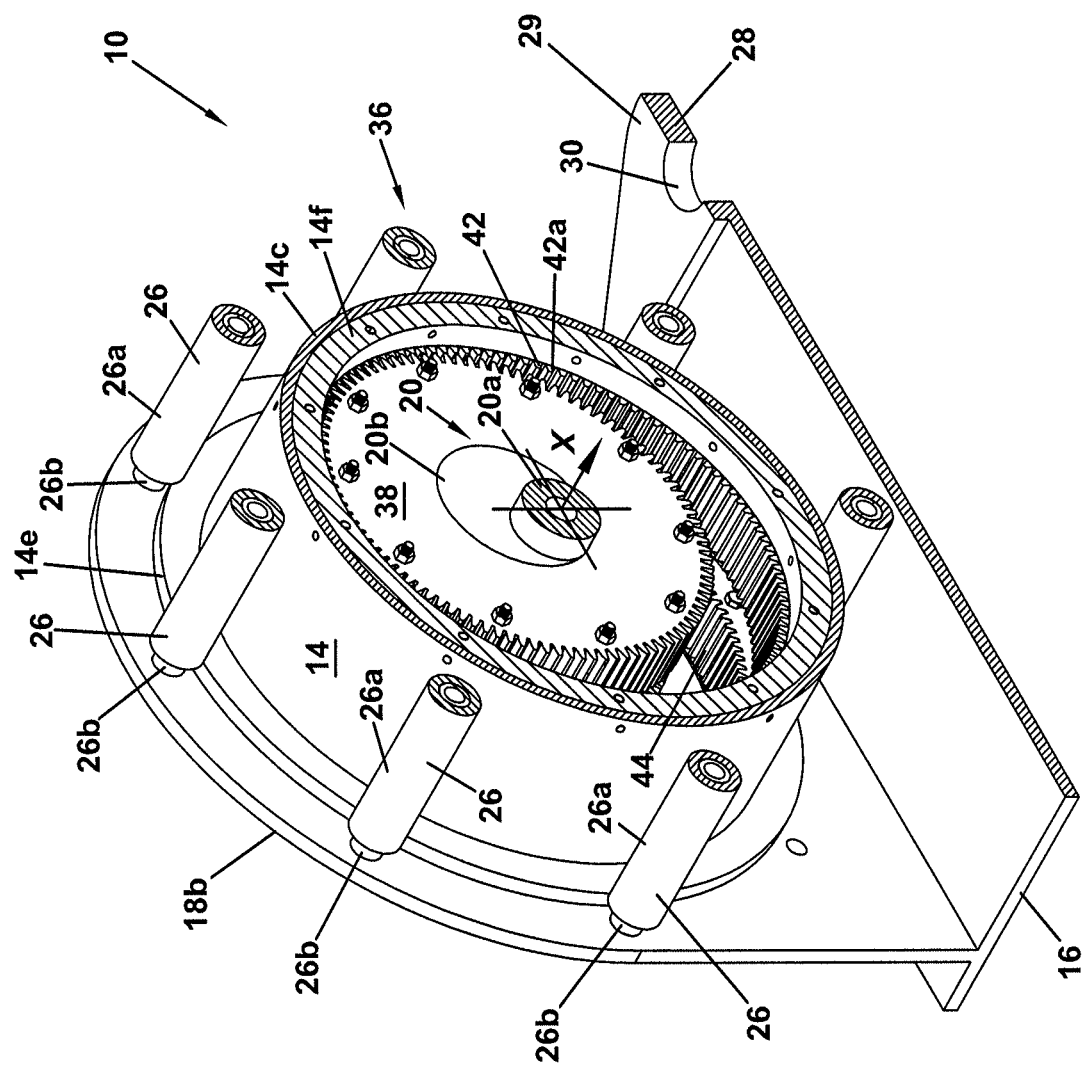
FIG. 9 is a schematic perspective section view taken along line C-C of FIG. 5.
Figure 10:
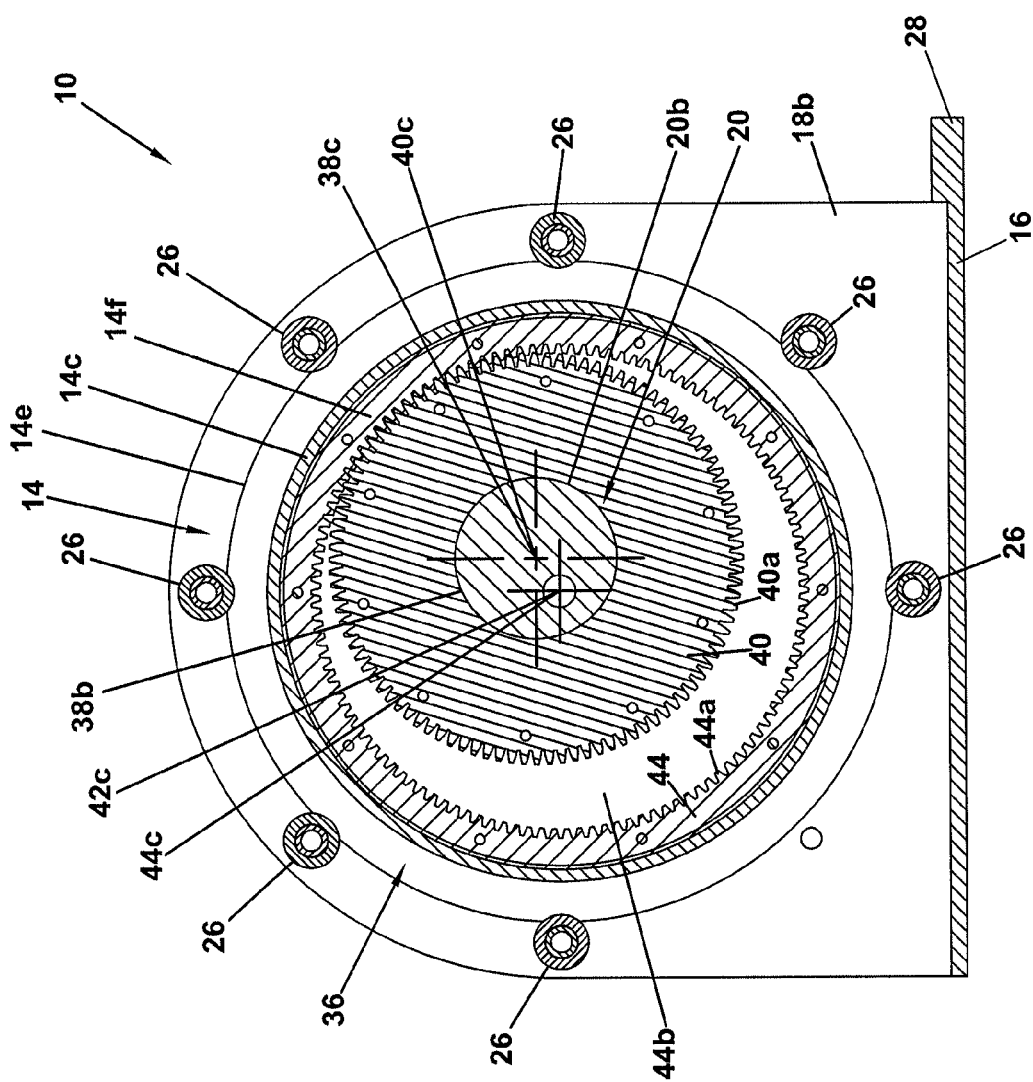
FIG. 10 is a schematic side section view taken along line D-D of FIG. 5.
Figure 11:
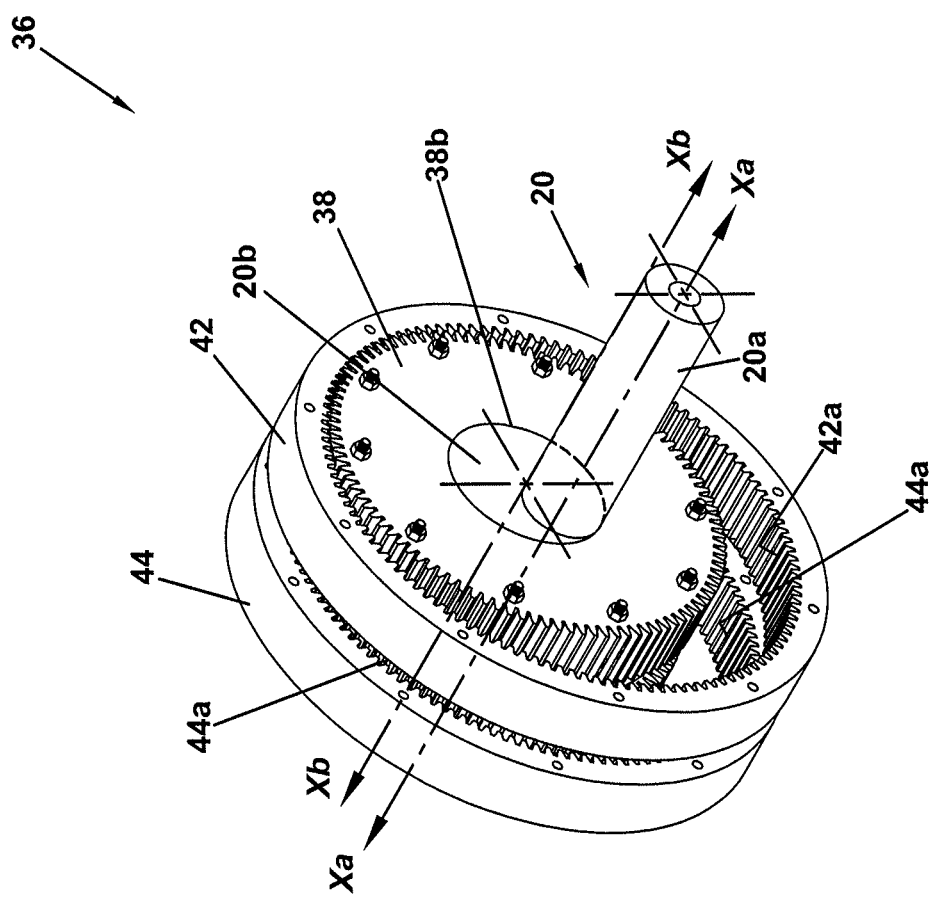
FIG. 11 is a schematic perspective view of an exemplary embodiment of a gear reduction assembly.

As shown in FIGS. 7-11, exemplary winch 10 includes a gear reduction assembly 36 configured to couple input shaft 20 with hub 14 in order to facilitate adjustment of tension and/or length of cable 12 (FIG. 1) extending from winch 10, by providing a mechanical link between hand operation and/or motor-/engine-driven operation of input shaft 20. As shown in, for example, FIGS. 3 and 4, exemplary gear reduction assembly 36 includes a first spur gear 38, a second spur gear 40, a first internal gear 42, and a second internal gear 44. With respect to the gears, the "spur" reference indicates that the gear teeth face radially outward, and the "internal" reference indicates that the teeth face radially inward. Each of first spur gear 38, second spur gear 40, first internal gear 42, and second internal gear 44 have respective teeth 38a, 40a, 42a, and 44a (FIGS. 7 and 10) and respective apertures 38b, 40b, 42b, and 44b (FIGS. 3, 4, 7, and 10), with respective centers 38c, 40c, 42c, and 44c (FIGS. 7, 8, and 10). According to some embodiments, a radially outer surface of second internal gear 44 may be configured to serve as guide member 32b, as shown in FIG. 3.

According to some embodiments, first spur gear 38 is coupled to second spur gear 40. Such coupling may result in first spur gear 38 and second spur gear 40 rotating at the same speed. For example, as shown in FIG. 3 first spur gear 38 is mounted on input shaft 20, with input shaft 20 extending through aperture 38b of first spur gear 38. Similarly, second spur gear 40 is mounted on input shaft 20, with input shaft 20 extending through aperture 40b of second spur gear 40. In the exemplary embodiment shown, first and second spur gears 38 and 40 are coupled to one another via bolts 39 (FIG. 7) on input shaft 20 in a longitudinally-spaced manner, with a spacer 46 sandwiched between them (see FIGS. 3 and 4). First and second spur gears 38 and 40 may be coupled to one another in other ways, or they may be formed integrally with one another.

Teeth 38a and 40a of respective first and second spur gears 38 and 40 engage with teeth 42a and 44a of first and second internal gears 42 and 44, respectively, as first and second spur gears 38 and 40 rotate and move within the space defined by the first and second internal gears 42 and 44. Rather than being coupled to input shaft 20, first internal gear 42 is coupled to hub 14 via internal flange 14f. For example, as shown in FIGS. 3 and 4, first internal gear 42 is coupled to internal flange 14f via fasteners, such as bolts 48. As a result, first spur gear 38 drives first internal gear 42, thereby driving hub 14. Second internal gear 44 is coupled to side member 18b via fasteners such as bolts 50, and thus, second internal gear 44 remains stationary, regardless of rotation of input shaft 20, first spur gear 38, and second spur gear 40.

Figure 12:
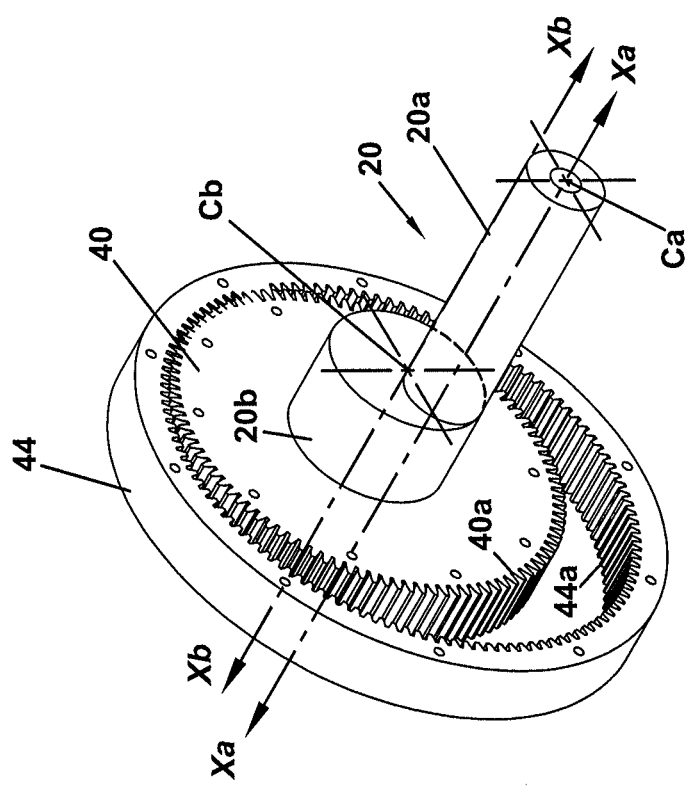
FIG. 12 is a schematic partial perspective view of a portion of the exemplary embodiment shown in FIG. 11.
Figure 13:
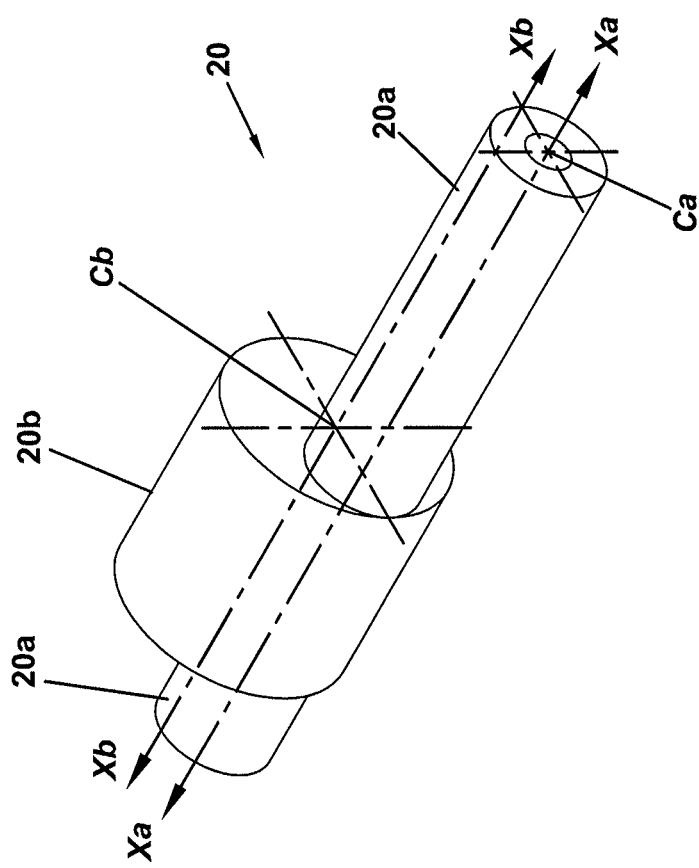
FIG. 13 is a schematic perspective view of an exemplary embodiment of an input shaft.

As shown in FIGS. 12 and 13, exemplary input shaft 20 includes a shaft portion 20a and a drive portion 20b between opposing ends of shaft portion 20a. Shaft portion 20a has a circular cross-section with a diameter and a center Ca lying on a longitudinal input axis Xa. The diameter of shaft portion 20a is dimensioned for shaft portion 20a to fit within bearings 24a and 24b (see FIGS. 3 and 4), thereby facilitating rotation of input shaft 20 relative to side members 18a and 18b. In the exemplary embodiment of input shaft 20 shown, shaft portion 20a is hollow; however, it is contemplated that shaft portion 20a may be solid.

Referring to FIGS. 12 and 13, exemplary drive portion 20b has a circular cross-section with a diameter and a center Cb lying on a longitudinal axis Xb that is spaced from and parallel to longitudinal input shaft axis Xa. By virtue of longitudinal axis Xb being spaced from longitudinal input axis Xa, as input shaft 20 rotates, with shaft portion 20a rotating about longitudinal input axis Xa, drive portion 20b revolves about longitudinal input axis Xa (i.e., longitudinal axis Xb revolves about longitudinal input axis Xa).

According to some embodiments (not shown), drive portion 20b may have two sections: a first section having a first circular cross-section with a first diameter and a first center lying on a first longitudinal axis that is spaced from and parallel to longitudinal input shaft axis Xa, and a second section having a second circular cross-section with a second diameter (either equal or different than the first section diameter) and a second center lying on a second longitudinal axis that is (1) spaced from and parallel to longitudinal input shaft axis Xa, and (2) spaced from and parallel to the first longitudinal axis of the first section. According to such embodiments, first spur gear 38 and second spur gear 40 are not coupled to one another, for example, via spacer 46 (FIGS. 3 and 4). Rather, first and second spur gears 38 and 40 rotate independently of one another.

In the exemplary embodiment shown in FIGS. 3 and 4, the diameter of drive portion 20b is dimensioned to fit and rotationally move within apertures 38a and 40a of respective first and second spur gears 38 and 40, with drive portion 20b having a longitudinal length at least sufficient to span from the side of first spur gear 38 facing side member 18a to the side of second spur gear 40 facing side member 18b.

Referring to FIGS. 7 and 8, centers 38c and 40c of apertures 38a and 40a of first and second spur gears 38 and 40 lie on a common axis, which is collinear with longitudinal axis Xb of drive portion 20b of input shaft 20. Thus, as input shaft 20 rotates, drive portion 20b of input shaft 20 revolves about shaft portion 20a. As drive portion 20b revolves, first spur gear 38, and second spur gear 40 revolve about longitudinal input axis Xa, with first and second spur gears 38 and 40 rotating about longitudinal axis Xb on drive portion 20b of input shaft 20. In the exemplary embodiment shown, centers 42c and 44c of first and second internal gears 42 and 44 lie on longitudinal input axis Xa.

In the exemplary embodiment shown, first spur gear 38 and second spur gear 40 have the same number of teeth. However, it is not necessary that first and second spur gears 38 and 40 have the same number of teeth. Exemplary first internal gear 42 and second internal gear 44 have a different number of teeth. For example, the number of teeth of first and second internal gears 42 and 44 may differ by from one to five teeth (e.g., by one tooth).

According to some embodiments, first internal gear 42 has from one to five more teeth than second internal gear 44, such as, for example, one more tooth than second internal gear 44. In such embodiments, first internal gear 42 will rotate in the same direction as input shaft 20. According to other embodiments, second internal gear 44 has from one to five more teeth than first internal gear 42, such as, for example, one more tooth than first internal gear 42. In such embodiments, first internal gear 42 will rotate in the opposite direction from input shaft 20.

Regardless of the number of teeth of first spur gear 38, second spur gear 40, first internal gear 42, and second internal gear 44, gears 38, 40, 42, and 44 may have any combination of diameters that results in first spur gear 38 and first internal gear 42 properly meshing, and second spur gear 40 and second internal gear 44 properly meshing. For example, it may be desirable for first spur gear 38 and first internal gear 42 to have respective diameters that are always tangent to one another as first spur gear 38 revolves within first internal gear 42. For example, it may be desirable for first spur gear 38 and first internal gear 42 to have respective pitch circle diameters that are always tangent to one another as first spur gear 38 revolves within first internal gear 42. Similarly, it may be desirable for second spur gear 40 and second internal gear 44 to have respective diameters that are always tangent to one another as second spur gear 40 revolves within second internal gear 44. For example, it may be desirable for second spur gear 40 and second internal gear 44 to have respective pitch circle diameters that are always tangent to one another as second spur gear 40 revolves within second internal gear 44.

According to some embodiments, first spur gear 38 and second spur gear 40 have the same number of teeth, but not the same diameter. For example, the pitch circle diameter of first spur gear 38 may be smaller than the pitch circle diameter of second spur gear 40. According to some embodiments, first spur gear 38 and second spur gear 40 have the same number of teeth, but the diameter of second spur gear 40 is smaller than the diameter of first spur gear 38 (e.g., the pitch circle diameter of second spur gear 40 is smaller than the pitch circle diameter of first spur gear 38). According to some embodiments, first spur gear 38 and second spur gear 40 have the same number of teeth and the same diameters (e.g., the same pitch circle diameters). According to some embodiments, first and second spur gears 38 and 40 have a different number of teeth and the same or different diameters (e.g., pitch circle diameters).

According to some embodiments, first internal gear 42 has from one to five teeth more than second internal gear 44, for example, one more tooth, but first internal gear 42 has a different diameter than second internal gear 44. For example, the pitch circle diameter of first internal gear 42 may be smaller than the pitch circle diameter of second internal gear 44. According to some embodiments, second internal gear 44 has from one to five teeth more than first internal gear 42, for example, one more tooth, but second internal gear 44 has a different diameter than first internal gear 42. For example, the pitch circle diameter of second internal gear 44 is smaller than the pitch circle diameter of first internal gear 42. According to some embodiments, the number of teeth of first internal gear 42 and second internal gear 44 differ by one to five teeth, for example, by one tooth, and first and second internal gears 42 and 44 have the same diameter (e.g., the same pitch circle diameter).

During operation of exemplary gear reduction assembly 36, input shaft 20 is driven via hand operation, or one or more motors and/or engines such that input shaft 20 rotates. As input shaft 20 rotates, drive portion 20b of input shaft 20 revolves about longitudinal input axis Xa. As drive portion 20b revolves, first and second spur gears 38 and 40 also revolve about longitudinal input axis Xa. Teeth 40a of second spur gear 40 are engaged with teeth 44a of second internal gear 44. Thus, as second spur gear 40 revolves about longitudinal input axis Xa, second internal gear 44, which is coupled to side member 18b such that it remains stationary, causes second spur gear 40 to rotate about its center 40c (see, e.g., FIG. 10). Second spur gear 40 is coupled to first spur gear 38 such that as second spur gear 40 rotates about its center 40c, first spur gear 38 also rotates about its center 38c as it revolves about longitudinal input axis Xa of input shaft 20 (see, e.g., FIG. 8). As first spur gear 38 rotates, its teeth 38a, which are engaged with teeth 42a of first internal gear, drive first internal gear 42 so that it rotates about longitudinal input axis Xa of input shaft 20. First internal gear 42 is coupled to hub 14 via internal flange 14f, thereby driving hub 14 and either deploying or retracting cable 12, depending on the direction of rotation of hub 14, the direction about which cable 12 is wound on hub 14, and/or whether first internal gear 42 or second internal gear 44 has more teeth. If first internal gear 42 has more teeth than second internal gear 44, first internal gear 42 and hub 14 will rotate in the same direction as input shaft 20. If second internal gear 44 has more teeth than first internal gear 42, first internal gear 42 and hub 14 will rotate in the opposite direction of input shaft 20.

As explained above, input shaft 20 drives second spur gear 40, which rotates by virtue of stationary second internal gear 44. Being coupled to first spur gear 38, second spur gear 40's rotation drives first spur gear 38, which, in turn, drives first internal gear 42 and hub 14. Thus, the difference between the speed of rotation of input shaft 20 and the speed of rotation of hub 14 is related to the number of teeth on first and second internal gears 42 and 44. In particular, if first internal gear 42 has more teeth than second internal gear 44, the ratio of the rotation speed of input shaft 20 to the rotation speed of first internal gear 42 (i.e., the ratio of input to output of the exemplary gear reduction assembly 36) is equal to the number of teeth 42a of first internal gear 42, divided by the difference between the number of teeth 42a of first internal gear 42 and the number of teeth 44a of second internal gear 44. For example, if first internal gear 42 has 200 teeth 42a and second internal gear 44 has 199 teeth 44a, the difference is one, and the ratio is 200:1, or the number of teeth of first internal gear 42, 200, divided by the difference, one. If, however, second internal gear 44 has more teeth than first internal gear 42, the ratio of the rotation speed of input shaft 20 to the rotation speed of first internal gear 42 (i.e., the ratio of input to output of the exemplary gear reduction assembly 36) is equal to the number of teeth 44a of second internal gear 44, divided by the difference between the number of teeth 44a of second internal gear 44 and the number of teeth 42a of first internal gear 44. Because first internal gear 42 will rotate in the opposite direction from the direction of rotation of input shaft 20 when second internal gear 44 has more teeth than first internal gear 42, a minus sign may be placed in front of the ratio. Thus, the ratio of the rotation speed of input shaft 20 to a rotation speed of first internal gear 42 is equal to the greater of the number of teeth of first internal gear 42 and the number of teeth of second internal gear 44, divided by the difference between the number of teeth of first internal gear 42 and the number of teeth of second internal gear 44.

As mentioned previously, for some embodiments, exemplary first spur gear 38 and second spur gear 40 have the same number of teeth, but different diameters, and first internal gear 42 and second internal gear 44 have a different number of teeth and different diameters. In such embodiments, second spur gear 40 may have a larger pitch circle diameter than the pitch circle diameter of first spur gear 38 in order to have a diameter large enough to facilitate engagement between its teeth 40a and the teeth 44a of second internal gear 44, which may have a pitch circle diameter larger than the pitch circle diameter of first internal gear 42.

Figure 14:
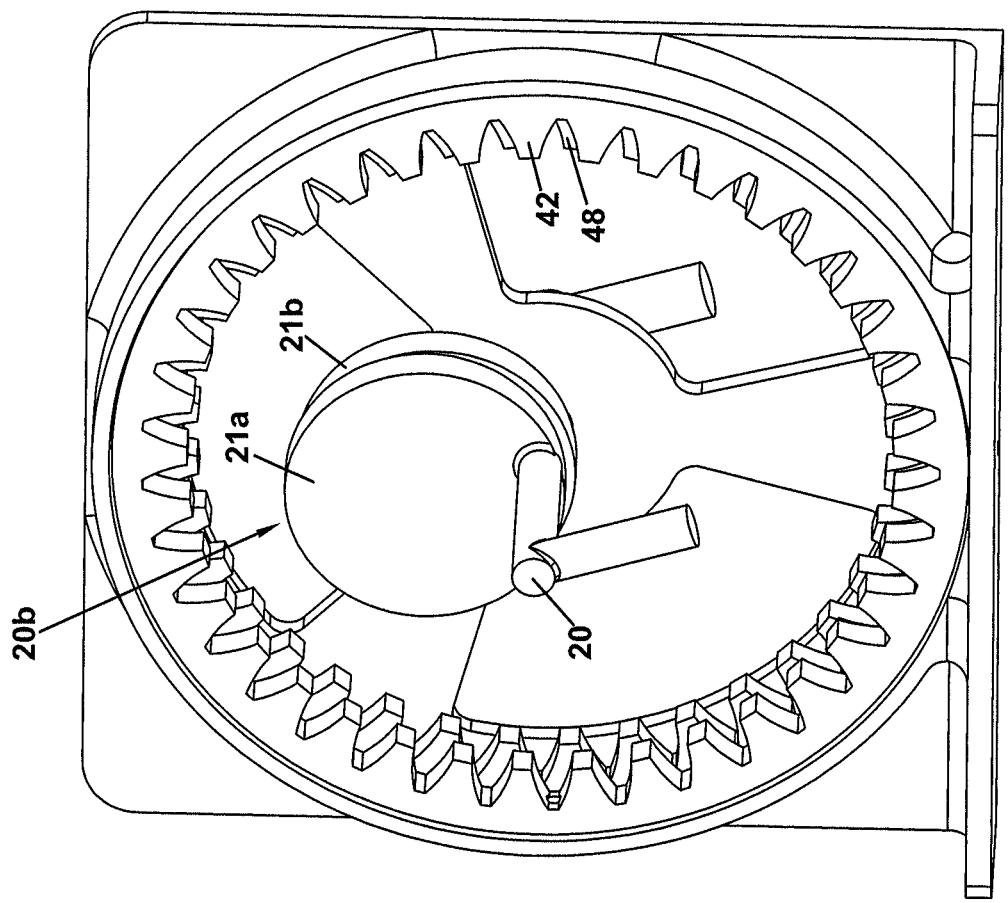
FIG. 14 is a schematic partial perspective view of another exemplary embodiment of a gear reduction assembly.
Figure 15:
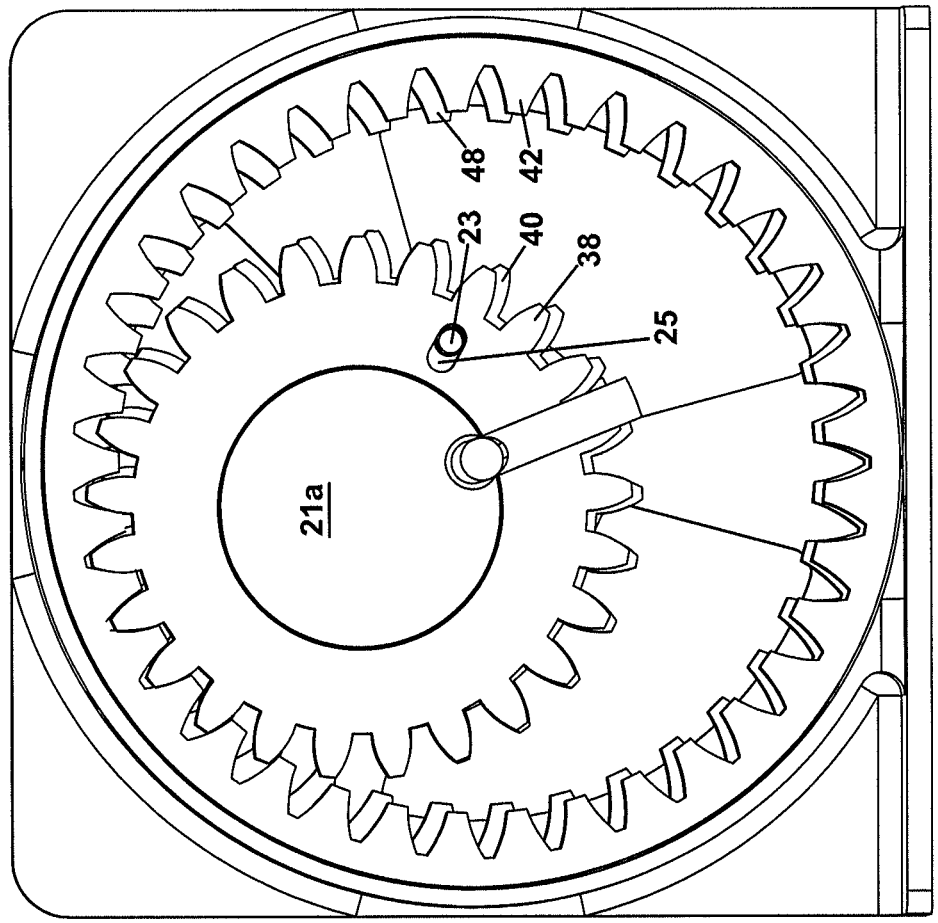
FIG. 15 is a schematic partial perspective view of the exemplary embodiment shown in FIG. 14.
Figure 16:
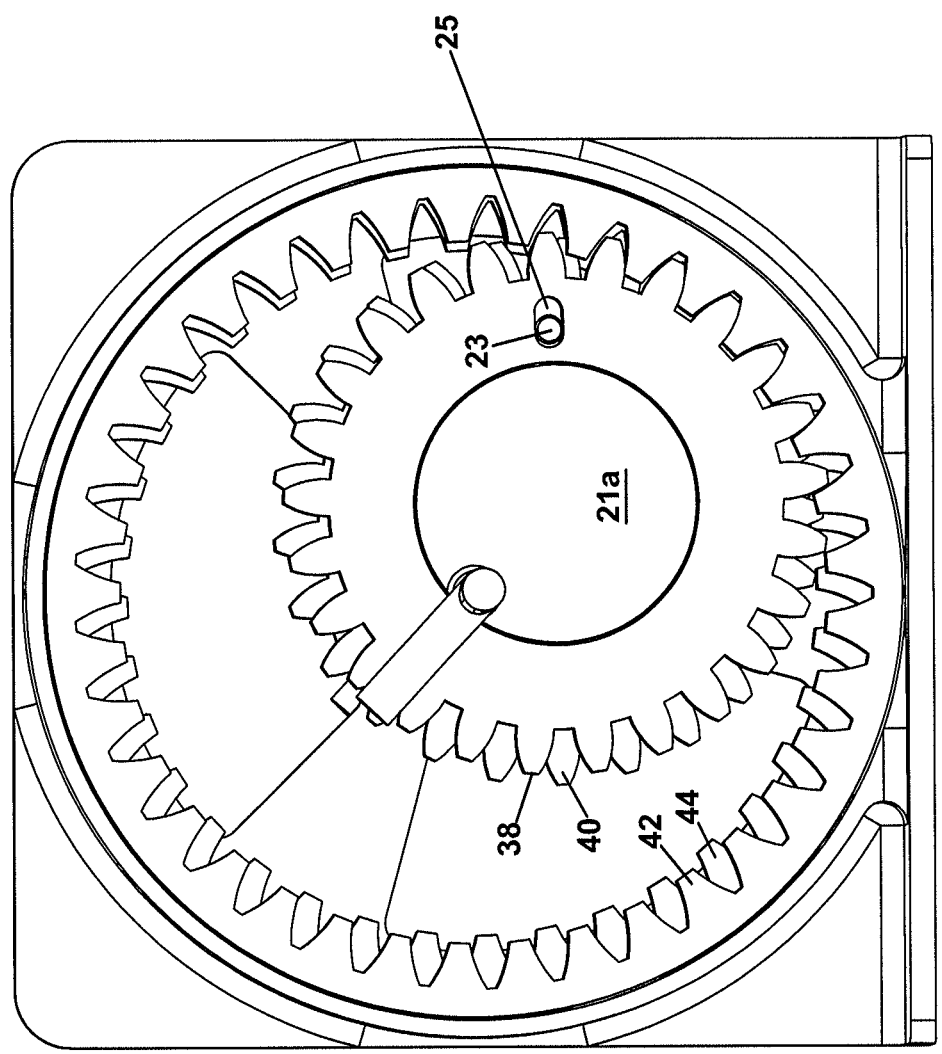
FIG. 16 is a schematic partial perspective view of the exemplary embodiment shown in FIG. 14 in an orientation different from the orientation shown in FIG. 15.

According to some embodiments, first and second spur gears 38 and 40 may be coupled to one another in a manner that permits them to rotate at different speeds. For example, as shown in FIGS. 14-16, drive portion 20b of input shaft 20 includes two drive portions 21a and 21b, each having a circular cross-section with a center lying on different axes (see, i.e., FIG. 14). Rather than being rigidly fixed to one another, first and second spur gears 38 and 40 are coupled solely via a drive pin 23 (see FIGS. 15 and 16). In particular, first spur gear 38 rotates on a first drive portion 21a, and second spur gear 40 rotates on a second drive portion 21b, such that they rotate independently of one another. As seen by comparing FIG. 15 with FIG. 16, drive pin 23 reciprocates within slot 25 as the first and second spur gears 38 and 40 rotate as different speeds.

Exemplary gear reduction assembly 36, when used with, for example, exemplary winch 10, may provide a relatively dramatic gear reduction in a relatively compact manner. Further, exemplary gear reduction assembly 36, when used with exemplary winch 10, may facilitate use of a drum having a relatively larger diameter, which may be driven with relatively less effort via hand and/or relatively less power via a motor and/or engine. According to some embodiments of winch 10, a gear train (not shown) may be used in conjunction with exemplary gear reduction assembly 36. For example, such a gear train could be coupled to input shaft 20 to alter (e.g., increase or decrease) the output ratio provided by gear reduction assembly 36.

According to some embodiments, exemplary gear reduction assembly 36 may be self-locking, for example, such that although hub 14 and first internal gear 42 may be driven by rotating input shaft 20, it may not be possible rotate hub 14 and first internal gear 42 by applying torque to hub 14 or first internal gear 42. For example, if exemplary gear reduction assembly 36 is used with exemplary winch 10, it may not be possible to pull against line 12 on hub 14 and move hub 14 and first internal gear 42. This may be desirable because it may preclude the need to provide a separate break mechanism or locking mechanism for winch 10. This self-locking nature may result from an inability to apply torque to drive portion 20b of input shaft 20 via first spur gear 38. Although first spur gear 38 is free to rotate about drive portion 20b, there is no way for first spur gear 38 to apply torque about longitudinal input axis Xa of input shaft 20, so that it revolves about longitudinal input axis Xa. Further, first spur gear 38 is rigidly coupled to second spur gear 40, which in turn, engages second internal gear 44. Second internal gear 44 is fixed so that it does not rotate, and thus, first spur gear 38 is prevented from rotating via second internal gear 44 and second spur gear 40.

According to the exemplary embodiments disclosed herein, the output of exemplary gear reduction assembly is concentric with the input. In other words, exemplary input shaft 20 and exemplary hub 14 lie on and rotate about the same longitudinal axis (i.e., longitudinal axis X). By virtue of this exemplary arrangement, hub 14 does not wobble with respect to the remainder of gear reduction assembly 36. This may be desirable because it avoids the possibility of providing a compensation mechanism to offset wobble of the hub 14 or output of the gear reduction assembly.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A gear reduction assembly comprising:
    an input shaft;
    a first spur gear;
    a second spur gear, the first spur gear and the second spur gear being coupled to one another, wherein at least one of the first spur gear and the second spur gear is associated with the input shaft such that the input shaft drives at least one of the first and second spur gears;
    a first internal gear engaged with the first spur gear;
    a second internal gear engaged with the second spur gear; and
    a hub associated with the first internal gear,
    wherein the first internal gear has a first number of teeth and the second internal gear has a second number of teeth, and the first number of teeth differs from the second number of teeth by from one to five teeth,
    wherein the first spur gear has a first diameter and the second spur gear has a second diameter, and the second diameter of the second spur gear is greater than the first diameter of the first spur gear, and
    wherein the first diameter of the first spur gear and the second diameter of the second spur gear are pitch circle diameters of the first spur gear and the second spur gear, respectively.

2. The assembly of claim 1, wherein the first spur gear and the second spur gear have the same number of teeth.

3. The assembly of claim 1, wherein the first number of teeth of the first internal gear ranges from one to five more than the second number of teeth of the second internal gear.

4. The assembly of claim 3, wherein the first internal gear has one more tooth than the second internal gear.

5. The assembly of claim 1, wherein the second number of teeth of the second internal gear ranges from one to five more than the first number of teeth of the first internal gear.

6. The assembly of claim 5, wherein the second internal gear has one more tooth than the first internal gear.

7. The assembly of claim 1, wherein the first spur gear and the second spur gear are coupled to one another such that the first spur gear and the second spur gear rotate at the same speed.

8. The assembly of claim 1, wherein the first spur gear has a first diameter and the second spur gear has a second diameter, and the first diameter of the first spur gear is greater than the second diameter of the second spur gear.

9. The assembly of claim 1, wherein the first internal gear has a first diameter and the second internal gear has a second diameter, the second diameter of the second internal gear being larger than the first diameter of the first internal gear.

10. The assembly of claim 1, wherein the first internal gear has a first diameter and the second internal gear has a second diameter, the first diameter of the first internal gear being larger than the second diameter of the second internal gear.

11. A gear reduction assembly comprising:
    an input shaft;
    a first spur gear;
    a second spur gear, the first spur gear and the second spur gear being coupled to one another wherein at least one of the first spur gear and the second spur gear is associated with the input shaft such that the input shaft drives at least one of the first and second spur gears;
    a first internal gear engaged with the first spur gear;
    a second internal gear engaged with the second spur gear; and
    a hub associated with the first internal gear,
    wherein the first internal gear has a first number of teeth and the second internal gear has a second number of teeth and the first number of teeth differs from the second number of teeth by from one to five teeth,
    wherein the first internal gear has a first diameter and the second internal gear has a second diameter, the second diameter of the second internal gear being larger than the first diameter of the first internal gear, and
    wherein the first diameter of the first internal gear and the second diameter of the second internal gear are pitch circle diameters of the first internal gear and the second internal gear, respectively.

12. The assembly of claim 1, wherein the input shaft has an input axis about which the input shaft rotates, wherein the first spur gear and the second spur gear rotate about a common axis, and wherein the common axis is parallel to and spaced from the input axis.

13. The assembly of claim 12, wherein the input shaft comprises a shaft portion that rotates about the input axis and a drive portion that revolves about the input axis.

14. A gear reduction assembly comprising:
    an input shaft;
    a first spur gear;

a second spur gear, the first spur gear and the second spur gear being coupled to one another, wherein at least one of the first spur gear and the second spur gear is associated with the input shaft such that the input shaft drives at least one of the first and second spur gears;
a first internal gear engaged with the first spur gear;
a second internal gear engaged with the second spur gear; and
a hub associated with the first internal gear,
wherein the first internal gear has a first number of teeth and the second internal gear has a second number of teeth, and the first number of teeth differs from the second number of teeth by from one to five teeth,
wherein the input shaft has an input axis about which the input shaft rotates, wherein the first spur gear and the second spur gear rotate about a common axis, and wherein the common axis is parallel to and spaced from the input axis,
wherein the input shaft comprises a shaft portion that rotates about the input axis and a drive portion that revolves about the input axis, and
wherein the drive portion has a circular cross-section, and wherein a center of the circular cross-section lies on the common axis of the first spur gear and the second spur gear.

15. A gear reduction assembly comprising:
an input shaft;
a first spur gear;
a second spur gear, the first spur gear and the second spur gear being coupled to one another, wherein at least one of the first spur gear and the second spur gear is associated with the input shaft such that the input shaft drives at least one of the first and second sour gears;
a first internal gear engaged with the first spur gear;
a second internal gear engaged with the second spur gear; and
a hub associated with the first internal gear,
wherein the first internal gear has a first number of teeth and the second internal gear has a second number of teeth, and the first number of teeth differs from the second number of teeth by from one to five teeth, and
wherein one of the first and second number of teeth of the first and second internal gears is greater, and wherein a ratio of a rotation speed of the input shaft to a rotation speed of the first internal gear equals the greater of the first number of teeth and the second number of teeth, divided by the difference between the first number of teeth of the first internal gear and the second number of teeth of the second internal gear.

16. The assembly of claim 1, wherein the second internal gear is fixed such that the second internal gear does not rotate as the input shaft rotates.

17. The assembly of claim 1, wherein the input shaft has an input axis about which the input shaft rotates, and wherein the first internal gear rotates about an axis collinear with the input axis.

18. The assembly of claim 1, wherein the first internal gear rotates in the same direction as the input shaft.

19. A gear reduction assembly comprising
an input shaft;
a first spur gear;
a second spur gear, the first spur gear and the second spur gear being coupled to one another, wherein at least one of the first spur gear and the second spur gear is associated with the input shaft such that the input shaft drives at least one of the first and second spur gears;
a first internal gear engaged with the first spur gear;
a second internal gear engaged with the second spur gear; and
a hub associated with the first internal gear,
wherein the first internal gear has a first number of teeth and the second internal gear has a second number of teeth and the first number of teeth differs from the second number of teeth by from one to five teeth, and
wherein the first internal gear rotates in the opposite direction from the input shaft.

20. The assembly of claim 1, wherein rotation f the first internal gear is concentric with rotation of the input shaft.

21. A gear reduction assembly comprising:
an input shaft;
a first spur gear;
a second spur gear, the first spur gear and the second spur gear being coupled to one another, wherein at least one of the first spur gear and the second spur gear is associated with the input shaft such that the input shaft drives at least one of the first and second spur gears;
a first internal gear engaged with the first spur gear;
a second internal gear engaged with the second spur gear; and
a hub associated with the first internal gear,
wherein the first internal gear has a first number of teeth and the second internal gear has a second number of teeth, and the first number of teeth differs from the second number of teeth by from one to five teeth, and
wherein the assembly is self-locking such that rotation of the first internal gear by applying torque to the hub is substantially inhibited.

22. The assembly of claim 1, wherein the hub is configured to at least one of deploy and retract line.

23. The assembly of claim 22, wherein the line comprises cable.

24. A gear reduction assembly comprising:
an input shaft;
a first spur gear;
a second spur gear, the first spur gear and the second spur gear being coupled to one another, wherein at least one of the first spur gear and the second spur gear is associated with the input shaft such that the input shaft drives at least one of the first and second spur gears;
a first internal gear engaged with the first spur gear;
a second internal gear engaged with the second spur gear; and
a hub associated with the first internal gear,
wherein the first internal gear has a first number of teeth and the second internal gear has a second number of teeth, and the first number of teeth differs from the second number of teeth by from one to five teeth,
wherein the first internal gear has a first diameter and the second internal gear has a second diameter, and the first diameter of the first internal gear differs from the second diameter of the second internal gear, and
wherein one of the first and second number of teeth of the first and second internal gears is greater, and wherein a ratio of a rotation speed of the input shaft to a rotation speed of the first internal gear equals the greater of the first number of teeth and the second number of teeth, divided by the difference between the first number of teeth of the first internal gear and the second number of teeth of the second internal gear.

25. The assembly of claim 24, wherein the second diameter of the second internal gear is greater than the first diameter of the first internal gear.

26. The assembly of claim 24, wherein the first diameter of the first internal gear is greater than the second diameter of the second internal gear.

27. A gear reduction assembly comprising:
an input shaft;
a first spur gear;
a second spur gear, the first spur gear and the second spur gear being coupled to one another, wherein at least one of the first spur gear and the second spur gear is associated with the input shaft such that the input shaft drives at least one of the first and second spur gears;
a first internal gear engaged with the first spur gear;
a second internal gear engaged with the second spur gear; and
a hub associated with the first internal gear,
wherein the first spur gear and the second spur gear have the same number of teeth,
wherein the first internal gear has a first number of teeth and the second internal gear has a second number of teeth, and the first number of teeth differs from the second number of teeth by from one to five teeth, and
wherein one of the first and second number of teeth of the first and second internal gears is greater, and wherein a ratio of a rotation speed of the input shaft to a rotation speed of the first internal gear equals the greater of the first number of teeth and the second number of teeth, divided by the difference between the first number of teeth of the first internal gear and the second number of teeth of the second internal gear.

28. The assembly of claim 27, wherein the first number of teeth of the first internal gear ranges from one to five more than the second number of teeth of the second internal gear.

29. The assembly of claim 28, wherein the first internal gear has one more tooth than the second internal gear.

30. The assembly of claim 27, wherein the second number of teeth of the second internal gear ranges from one to five more than the first number of teeth of the first internal gear.

31. The assembly of claim 30, wherein the second internal gear has one more tooth than the first internal gear.

32. A gear reduction assembly comprising:
an input shaft;
a first spur gear;
a second spur gear, the first spur gear and the second spur gear being coupled to one another, wherein at least one of the first spur gear and the second spur gear is associated with the input shaft such that the input shaft drives at least one of the first and second spur gears;
a first internal gear engaged with the first spur gear;
a second internal gear engaged with the second spur gear; and
a hub associated with the first internal gear,
wherein the input shaft defines an input axis about which it rotates,
wherein the first spur gear and the second spur gear rotate about a common axis,
wherein the common axis is parallel to and spaced from the input axis,
wherein the input shaft comprises a shaft portion that rotates about the input axis and a drive portion that revolves about the input axis, and
wherein the drive portion has a circular cross-section, and wherein a center of the circular cross-section lies on the common axis of the first spur gear and the second spur gear.

33. A gear reduction assembly comprising:
an input shaft;
a first spur gear;
a second spur gear, the first spur gear and the second spur gear being coupled to one another, wherein at least one of the first spur gear and the second spur gear is associated with the input shaft such that the input shaft drives at least one of the first and second spur gears;
a first internal gear engaged with the first spur gear;
a second internal gear engaged with the second spur gear; and
a hub associated with the first internal gear,
wherein the input shaft defines an input axis about which it rotates,
wherein the first spur gear and the second spur gear rotate about a common axis,
wherein the common axis is parallel to and spaced from the input axis, and
wherein one of the first and second number of teeth of the first and second internal gears is greater, and wherein a ratio of a rotation speed of the input shaft to a rotation speed of the first internal gear equals the greater of the first number of teeth and the second number of teeth, divided by the difference between the first number of teeth of the first internal gear and the second number of teeth of the second internal gear.

34. The assembly of claim 32, wherein the input shaft has an input axis about which the input shaft rotates, and wherein the first internal gear rotates about an axis collinear with the input axis.

35. A gear reduction assembly comprising:
an input shaft;
a first spur gear;
a second spur gear, the first spur gear and the second spur gear being coupled to one another, wherein at least one of the first spur gear and the second spur gear is associated with the input shaft such that the input shaft drives at least one of the first and second spur gears;
a first internal gear engaged with the first spur gear;
a second internal gear engaged with the second spur gear; and
a hub associated with the first internal gear,
wherein the first internal gear has a first number of teeth and the second internal gear has a second number of teeth,
wherein one of the first and second number of teeth of and second internal gears is greater, and
wherein a ratio of a rotation speed of the input shaft to a rotation speed of the first internal gear equals the greater of the first number of teeth and the second number of teeth, divided by the difference between the first number of teeth of the first internal gear and the second number of teeth of the second internal gear.

36. The assembly of claim 35, wherein the first internal gear has a first number of teeth and the second internal gear has a second number of teeth, and the first number of teeth differs from the second number of teeth by from ne to five teeth.

37. The assembly of claim 36, wherein the first number of teeth of the first internal gear ranges from one to five more than the second number of teeth of the second internal gear.

38. The assembly of claim 37, wherein the first internal gear has one more tooth than the second internal gear.

39. The assembly of claim 36, wherein the second number of teeth of the second internal gear ranges from one to five more than the first number of teeth of the first internal gear.

40. The assembly of claim 39, wherein the second internal gear has one more tooth than the first internal gear.

41. A winch for at least one of deploying line and retracting line, the winch comprising:

a base member;
two side members coupled to the base member;
a hub about which line may be wound; and
a gear reduction assembly comprising:
- an input shaft extending through an aperture in one of the side members, the input shaft being rotatably supported by the side member,
- a first spur gear,
- a second spur gear, the first spur gear and the second spur gear being coupled to one another, wherein at least one of the first spur gear and the second spur gear is associated with the input shaft such that the input shaft drives at least one of the first and second spur gears,
- a first internal gear engaged with the first spur gear, and
- a second internal gear engaged with the second spur gear,
- wherein the first internal gear and the hub are coupled to one another,
- wherein the second internal gear and one of the side members are coupled to one another, and
- wherein rotation of the input shaft results in rotation of the hub.

42. The winch of claim 41, wherein the first spur gear and the second spur gear are coupled to one another such that the first spur gear and the second spur gear rotate at the same speed.

43. The winch of claim 41, wherein the winch comprises an anchor configured to couple the winch to a support.

44. The winch of claim 43, wherein the anchor comprises an extension.

45. The winch of claim 44, wherein the extension has an aperture configured to be coupled to the support.

46. The winch of claim 41, wherein the hub comprises an internal flange, wherein the first internal gear and the internal flange are coupled to one another.

47. The winch of claim 41, wherein the hub comprises opposing edges and an opposing external flange adjacent each of the edges.

48. The winch of claim 47, further comprising at least one cross member extending between the two side members, wherein the at least one cross member is configured to provide clearance for the external flanges.

49. The winch of claim 41, further comprising a guide member associated with one of the side members, wherein an internal edge of the hub rotates about the guide member.

50. The winch of claim 41, wherein the input shaft extends at least partially through apertures in each of the side members.

51. The winch of claim 41, wherein the drum rotates in the same direction as the input shaft.

52. The winch of claim 41, wherein the drum rotates in the opposite direction from the input shaft.

53. The winch of claim 41, wherein rotation of the drum is concentric with rotation of the input shaft.

54. The winch of claim 41, wherein the winch is self-locking such rotation of the hub by applying torque to the hub is substantially inhibited.

55. A winch for at least one of deploying line and retracting line, the winch comprising:
- a base member;
- two side members coupled to the base member;
- a hub about which line may be wound; and
- a gear reduction assembly according to claim 1,
- wherein the hub and the first internal gear are coupled to one another.

* * * * *

UNITED STATES PATENT AND TRADEMARK OFFICE
CERTIFICATE OF CORRECTION

| | | |
|---|---|---|
| PATENT NO. | : 8,808,130 B2 | Page 1 of 1 |
| APPLICATION NO. | : 13/229901 | |
| DATED | : August 19, 2014 | |
| INVENTOR(S) | : Stephen P. Wilkins et al. | |

It is certified that error appears in the above-identified patent and that said Letters Patent is hereby corrected as shown below:

On the Title Page

Abstract, Line 9, "gear The" should read as --gear. The--.

In the Claims

Claim 36, Col. 16, Line 54, "ne" should read as --one--.

Claim 54, Col. 18, Line 23, "such rotation" should read as --such that rotation--.

Signed and Sealed this
Seventeenth Day of February, 2015

Michelle K. Lee
*Deputy Director of the United States Patent and Trademark Office*